United States Patent [19]

Nagasubramanian et al.

[11] Patent Number: 5,110,694
[45] Date of Patent: May 5, 1992

[54] SECONDARY LI BATTERY INCORPORATING 12-CROWN-4 ETHER

[75] Inventors: Ganesan Nagasubramanian, La Crescenta; Salvador DiStefano, Alhambra, both of Calif.

[73] Assignee: The United States of America as represented by the Administrator of the National Aeronautics and Space Administration, Washington, D.C.

[21] Appl. No.: 596,139

[22] Filed: Oct. 11, 1990

[51] Int. Cl.⁵ .......................................... H01M 10/40
[52] U.S. Cl. ................................... 429/192; 252/62.2
[58] Field of Search ............... 429/192, 198; 252/62.2

[56] References Cited

U.S. PATENT DOCUMENTS

| | | |
|---|---|---|
| 4,132,837 | 1/1979 | Soffer . |
| 4,271,425 | 6/1981 | Wong . |
| 4,609,600 | 9/1986 | Heinze et al. . |
| 4,618,548 | 10/1986 | Brule .............................. 429/198 X |
| 4,791,374 | 12/1988 | Yodice . |
| 4,839,322 | 6/1989 | Yodice . |

OTHER PUBLICATIONS

D. E. Fenton, J. M. Parker and P. V. Wright, Polymer, 14, 589 (1973).
P. M. Blonsky, D. F. Schriver, P. Austin and H. R. Allcock, J. Am. Chem. Soc., 106 6854 (1984).
M. L. Kaplan, E. A. Rietman, R. J. Cava, L. K. Holt and E. A. Chandross, Solid State Ionics, 25, 37 (1987).
J. E. Weston and B. C. H. Steele, Solid State Ionics, 7, 75 (1982).
A. Killis, J-F. LeNest, A. Goandini and H. Cheradame, Macromolecules, 17, 63 (1984).
K. M. Abraham, M. Alamigir and R. K. Reynolds, J. Electrochem. Soc., 136, 3576 (1989).
I. Molenda, A. Stocklosa and T. Bak, Solid State Ionics, 36, 53 (1989).
G. Nagasubramanian and S. DiStefano, 176th ECS Meeting, Hollywood Fla., Oct. 15-20 (1989).
M. Morita, H. Hayashida a Y. Matsuda, J. Electrochem. Soc., 134, 2107 (1987).
D. Fateux, J. Electrochm. Soc., 135, 2231 (1988).
W. N. Olmstead in Proceedings of the Symposium on Li Batteries, ed. by H. V. Vankatesetty, p. 144 (1981).

Primary Examiner—Stephen Kalafut
Attorney, Agent, or Firm—Thomas H. Jones; John R. Manning

[57] ABSTRACT

The conductivity is increased an order of magnitude and interfacial charge transfer resistance is substantially decreased by incorporating a minor amount of 12-Crown-4 ether in a polyethylene oxide-lithium salt solid electrolyte film.

12 Claims, 3 Drawing Sheets

● = +12 CROWN ETHER (1.5 mM)
▼ = +12 CROWN ETHER (3 mM)
□ = +12 CROWN ETHER (6mM)
○ = REF 8
■ = PEO + LiClO$_4$ + 12 CR$_4$ (0.3 mM)
△ = PEO$_8$CF$_3$SO$_3$Li

SECONDARY LI BATTERY INCORPORATING 12-CROWN-4 ETHER

DESCRIPTION

1. Origin of the Invention

The invention described herein was made in the performance of work under a NASA contract, and is subject to the provisions of Public Law 96-517 (35 USC 202) in which the Contractor has elected not to retain title.

2. Technical Field

This invention relates to secondary, lithium polymeric electrolyte batteries and, more particularly, this invention relates to a rechargeable, lithium battery utilizing a lithium salt-polyethylene oxide solid electrolyte having increased conductivity and reduced interfacial charge transfer resistance.

BACKGROUND OF THE INVENTION

Rechargeable, lightweight batteries are desired as miniaturized power sources for use in microelectronic devices in consumer, space, transportation and military applications. Solid state, high specific energy batteries are under development based on use of alkali metalionic polymeric complexes. Most of these batteries are based on lithium since it has such a low atomic weight and is highly electronegative. Lithium batteries based on liquid solvent containing electrolytes are unstable and present leakage problems. Molten electrolytes require high temperature environments.

The lifetime and number of discharge-charge cycles demanded of a lithium battery place stringent requirements on the components of the battery. The battery components also have mechanical, thermal and electrochemical constraints arising from the conditions of service. The electrolyte is subjected to the most stringent requirements since it provides several functions. The polymeric electrolyte must function as a lithium ion carrier, a separator and a binding agent for the positive electrode such as a titanium disulfide or cobalt oxide composite electrode. Solid state lithium-ion conducting polymeric electrolytes provide good adhesion, are deformable and have good elasticity.

Polyethylene oxide has been found to be the most satisfactory solid polyelectrolyte for use in thin film lithium batteries due to the formation of conducting complexes with lithium salts and the ability to be recharged. Batteries containing polyethylene oxide (PEO) films are compatible with other components of the battery and exhibit the mechanical properties required for a thin film battery. However, the PEO salt films exhibit low conductivity at room temperature and low cation transport.

Approaches to improving the conductivity of PEO-lithium salt electrolyte films include adding inert fillers such as $Al_2O_3$ and plasticizers such as glyme to PEO or other polymer electrolytes (2,3) or mixing the PEO with another polymer such as propylene oxide (PPO), poly(bis-(methoxyethoxy ethoxide)-phosphazene) and the like (4).

STATEMENT OF THE INVENTION

Novel solid state polymer electrolyte films are provided in accordance with the invention having a substantially higher conductivity, a lower charge transfer resistance and a potential closer to the reversible $Li^+/Li$ potential. Oxidation/reduction of lithium is both kinetically and thermodynamically favored in the polymer electrolyte of the invention. An order of magnitude increase in bulk conductivity results in 100 fold increase in power density. Battery efficiency is increased and the temperature of operation is decreased in batteries utilizing the improved polymeric electrolyte of the invention.

The polymeric electrolyte of the invention comprises a thin film of a solid polyethylene oxide complexed with a minor amount of a lithium salt containing an amount of 12-Crown-4 ether (12CR4) effective to increase ionic conductivity by a factor of at least 5. The addition of 12CR4 also results in a reduction of interfacial charge transfer resistance by a factor of at least 3 in one polyethylene oxide-lithium salt complex to a factor of over 25 with other polyethylene oxide-lithium salt complexes. The improvement in conductivity and the lowering charge transfer resistance has been demonstrated with several lithium salt polymer complexes.

List of the Prior Art

1. D. E. Fenton, J. M. Parker and P. V. Wright, Polymer, 14. 589 (1973).
2. (a) P. M. Blonsky, D. F. Shriver, P. Austin and H. R. Allcock, J. Am. Chem. Soc., 106 6854 (1984).
2. (b) M. L. Kaplan, E. A. Rietman, R. J. Cava, L. K. Holt and E. A. Chandross, Solid State Ionics, 25, 37 (1987).
3. J. E. Weston and B. C. H. Steele, Solid State Ionics, 7, 75 (1982).
4. (a) A. Killis, J-F. Le Nest, A. Goandini and H. Cheradame, Macromolucules, 17, 63 (1984).
4. (b) K. M. Abraham, M. Alamigir and R. K. Reynolds, J. Electrochem. Soc., 136, 3576 (1989).
5. I. Molenda, A. Stoklosa and T. Bak, Solid State Ionics, 36. 53 (1989).
6. G. Nagasubramanian and S. Distefano, 176th ECS Meeting. Hollywood Fla., Oct. 15-20 (1989).
7. M. Morita, H. Hayashida a Y. Matsuda, J. Electrochem. Soc., 134. 2107 (1987).
8. D. Fateux, J. Electrochem. Soc., 135, 2231 (1988).
9. W. N. Olmstead in Proceedings of the Symposium on Li Batteries, ed. by H. V. Vankatesetty, p. 144 (1981).

| Patentee | U.S. Pat. No. | Date |
| --- | --- | --- |
| 10. Soffer | 4,132,837 | January 2, 1979 |
| 11. Wong | 4,271,425 | June 2, 1981 |
| 12. Heinze et al. | 4,609,600 | September 2, 1986 |
| 13. Yodice I | 4,791,374 | December 13, 1988 |
| 14. Yodice II | 4,839,322 | June 13, 1989 |

STATEMENT OF THE PRIOR ART

The ionic conductivity of alkali metal-polyethylene oxide (PEO) was discovered by Fenton et al (1). The very low ionic conductivity ($<10^{-6}$ S cm$^{-1}$) of this electrolyte has been enhanced by use of polyphosphaze as the polymer (2a) addition of inert fillers such as alumina (3) to the Li salt-PEO complex, use of mixed polymers such as PEO-polyurethane (4a) or methoxyethoxyethoxide (MEEP)-PEO (4b) or modification of the cathode material such as cobalt bronze, $Li_xCoO_2$ (5). Crown ethers have been added to poly (vinylene carbonate)-lithium salt complexes and other polymers to increase conductivity (2b,7,9). The addition of 12CR4 ether to a PEO-lithium salt complex electrolyte (6) by the inventors has been reported.

The most relevant of the U.S. Patents is Soffer (10) who discloses the addition of crown ethers to improve the stability of solvents such as propylene carbonate in a lithium battery. Heinze et al (12) teach the addition of organic ligand complexing agents such as a crown ether, a cryptand or a pod-and such as 15-crown-5 ether to a solvent based electrolyte in an alkali metal electrochemical cell. The remaining references disclose addition of various crown ethers to conducting polymers such as pyrolle (13,14) or silicone (11).

The present invention relates to the increase in conductivity of neat PEO-Li salt films by the addition of 12-crown-4 ether. The combination of increased conductivity and reduced charge transfer resistance results in a dramatic improvement in performance which is crucial to the development of thin film polymer based batteries for space and consumer electronic applications.

These and many other features and attendant advantages of the invention will become apparent as the invention becomes better understood by reference to the following detailed description when considered in conjunction with the accompanying drawings.

DETAILED DESCRIPTION OF THE INVENTION

Figure 4:
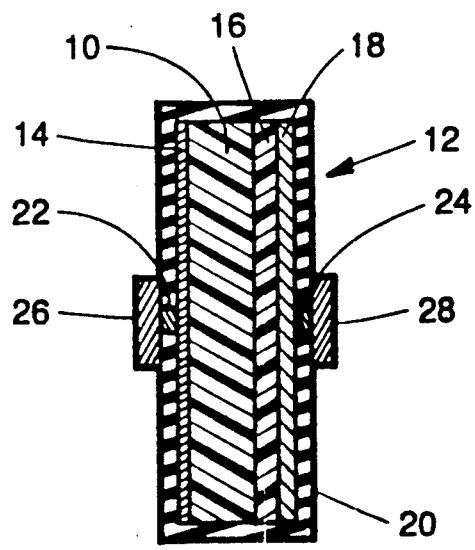
FIG. 4 is a schematic representation of a battery containing the solid polyelectrolyte film of the invention.

The electrolyte film 10 of the invention is utilized in a thin solid state battery 12 shown in FIG. 4. The battery 12 includes an anode 14 comprising a thin film of lithium metal or an alloy thereof, the electrolyte film 10 and a cathode 16 which may be attached to a current collector 18 such as stainless steel. The battery may be enclosed in a hermetically sealed polymeric enclosure 20. Leads 22, 24 connect the anode 14 and cathode 16 to terminals 26, 28. The battery may suitably be provided in disc form with a terminal 26, 28 on the top and bottom faces, respectively.

The solid, polymeric electrolyte comprises a polyethylene oxide polymer having a molecular weight from about $10^4$ to about $10^7$, suitably, about $10^6$. Minor amounts of from 0 to 30% by weight of other polymers such as polypropylene, polyphosphazene, polysiloxane, polyurethane or polyethylene may be mixed with the polyethylene oxide in order to modify the physical and electrochemical performance of the solid polyelectrolyte. The solid polyelectrolyte contains based on the oxygen content of the polyethylene oxide from 1/1 to 100/1 of a lithium ion provided as a salt. The salt is dispersed and dissolved in the PEO. It is believed that the lithium ion is complexed by cage-like moieties assumed by the PEO. Usually the ratio of O/Li is from 1/1 to 10/1. The lithium salt can be selected from LiBF$_4$, LiCF$_3$SO$_3$, LiClO$_4$ or LiAsF$_6$. The 12 crown-4-ether is present in the solid electrolyte in an amount effective to increase conductivity by a factor of at least 5. The 12CR4 ether is present in a minimum amount of 1 mM up to about 6 mM. It is found that at concentrations of 12CR4 ethers above 3 mM the conductivity decreases.

The solid electrolyte is formed by dissolving the PEO, lithium salt and 12CR4 ether in a solvent such as acetonitrite with stirring. The mixture is placed in a mold and the solvent allowed to evaporate to forms a thin film having a thickness from about 1 to $10^3 \mu$m. The cathode is usually an insertion type cathode such as CoO$_2$ or TiS$_2$ dispersed in a polymer matrix.

The invention will now be illustrated by the following experiments.

EXPERIMENT

Polyethylene oxide (M.W.=$4 \times 10^6$), lithium triflate (LiCF$_3$SO$_3$) and lithium perchlorate (LiClO$_4$) were dried under dynamic vacuum ($>10^{-5}$ Torr) for 48 hours. Solvent acetonitrile (MeCN) and 12-Crown-4 ether (12CR4) were used as received. Thin film casting was done inside an argon-filled glove box. Appropriate amounts of PEO and either LiCF$_3$SO$_3$ or LiClO$_4$ were weighted, to yield an oxygen to lithium ratio of 5:1, and transferred to a Teflon beaker to which a predetermined volume of 12CR4 was added. To this mixture was added 100-150 ml of MeCN and was stirred overnight, after which the viscous liquid was transferred to Teflon molds and the solvent was allowed to evaporate. This procedure yielded ~100 $\mu$m thick films. The films were vacuum dried at 100° C. for 48 hours. An electrochemical cell designed to hold a sample in a fixed geometry and with a known cross-sectional area was used. Standard electrochemical equipment was used to make the measurements. Polymer thin films are denoted as follows:

PEO/LiCF$_3$SO$_3$: A
PEO/LiCF$_3$SO$_3$/12CR4: A-12CR4
PEO/LiClO$_4$: B
PEO/LiClO$_4$/12CR4: B-12CR4

RESULTS AND DISCUSSION

A. DC Measurements

Figure 1:
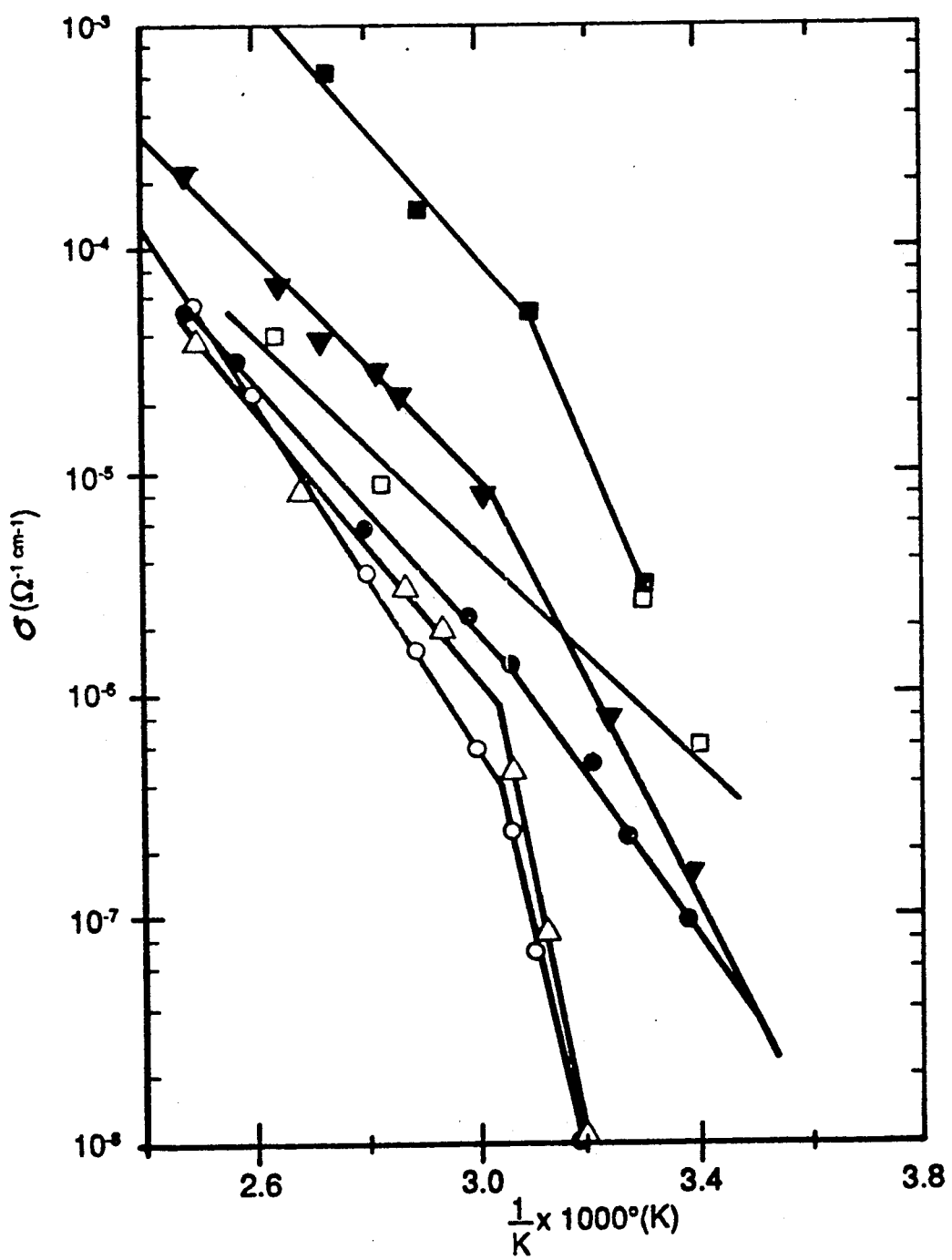
FIG. 1 is a series of curves of ionic conductivity vs. 1/T.

In FIG. 1 is shown the plot of the ionic conductivity as a function of temperature for A, B, A-12CR4 (three different concentrations of 12CR4) and B-12CR4 (one concentration of 12CR4). Literature values (8) for A are also plotted for comparison. The conductivity ($\sigma$, Scm$^1$) values were determined from the resistance values at 100 kHz obtained with the polymer film sandwiched between two Li foils which are in turn pressed against the Ni electrodes. The plots demonstrate the following features:

The conductivity of the PEO-salt film is comparable to that reported in literature.

Although $\sigma$ is higher for 12CR4 containing films, the increase is not monotonic with increasing 12CR4 concentrations but peaks at a concentration of approximately 3 mM.

Compared to A, B has a higher $\sigma$ for B-12CR4 (~3 mM).

Figures 2A, 2B, 2C:
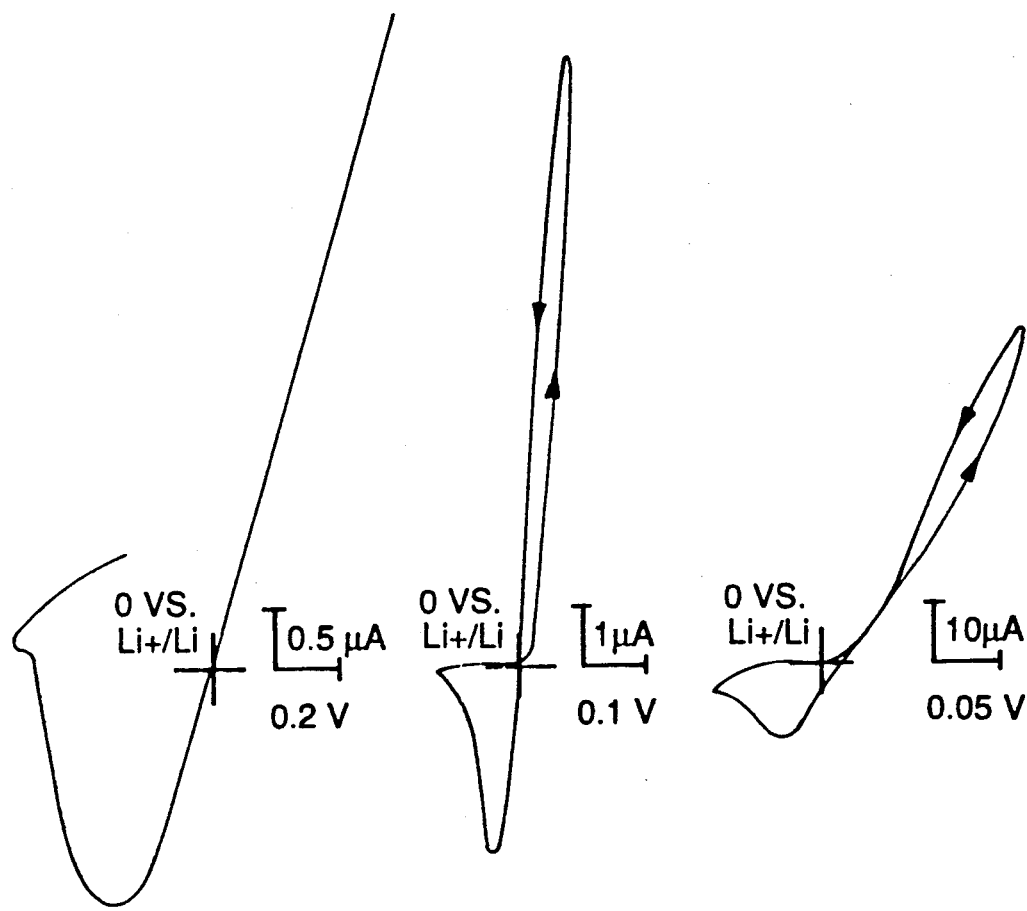
FIG. 2A is a curve showing plating/stripping of Li at about 70° C. at a scan rate of 1mV/sec in PEO/LiCF$_3$SO$_3$.
FIG. 2B is a curve showing plating/stripping of Li at about 70° C. at a scan rate of 1 mV/sec in PEO/LiCF$_3$SO$_3$/12CR4 (3 mM)
FIG. 2C is a curve showing plating/stripping of Li at about 70° C. PEO/LiClO$_4$/12CR4 (3 mM at a scan rate of 1 mV/sec.

In FIG. 2 the cyclic voltammetric behavior of plating and stripping of Li at Ni electrodes in A, A-12CR4 and B-12CR4 at approximately 70° C. The following observations are evident:

As shown, plating/stripping occurs at a potential closer to $Li^+/Li$ for 12CR4 incorporated samples than those without.

Of the two salts ($LiCF_3SO_3$ and $LiClO_4$) studied, the plating/stripping occurs at a potential closer to $Li^+/Li$ for B-12CR4 than for A-12CR4.

Figure 3A:
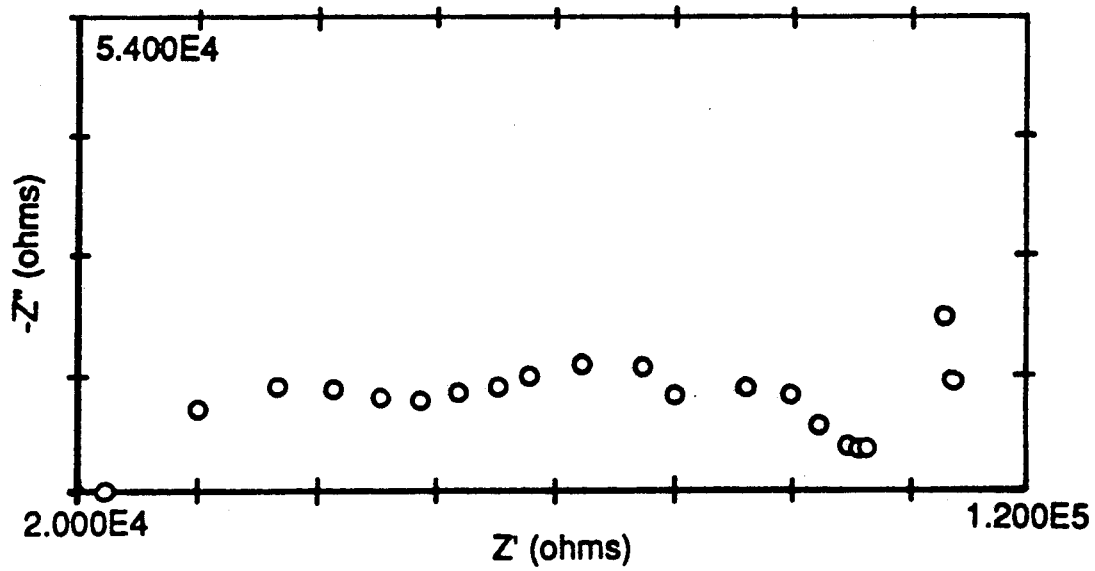
FIG. 3(a) is a curve showing complex impedance behavior of PEO/LiCF$_3$SO$_3$ (5:1) over a frequency range of 100 kHz-0.1 Hz.
Figure 3B:
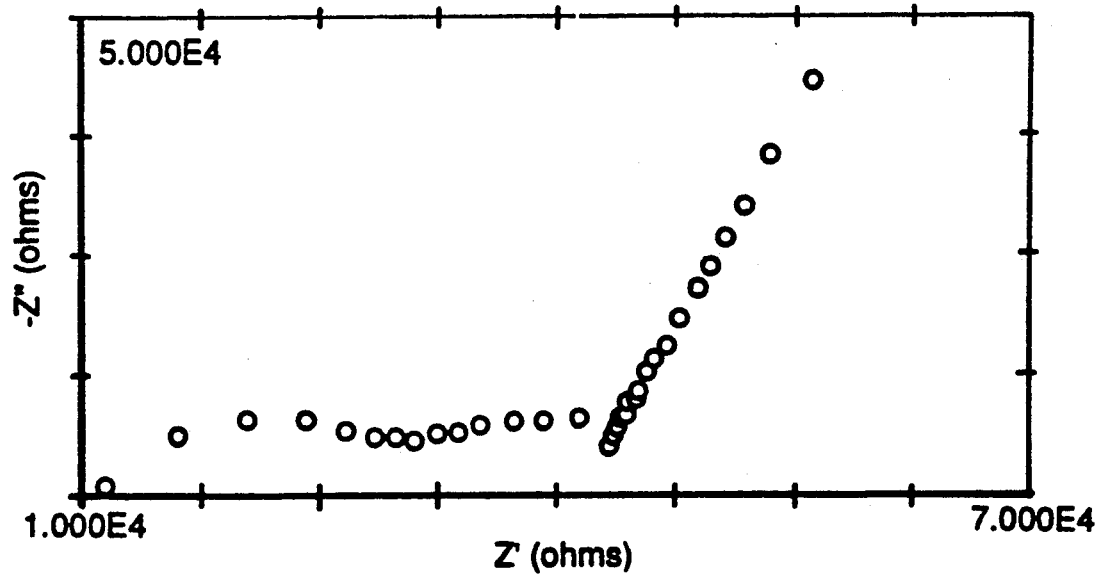
FIG. 3(b) is a curve showing complex impedance behavior of PEO/LiCF$_3$SO$_3$ (5:1)/12CR4 (3 mM) over the same frequency range as FIG. 3(a)

The complex impedance behavior of both A and A-12CR4 are shown in FIG. 3 at approximately 65° C. Both polymer electrolytes exhibit two poorly resolved semicircles followed by a straight line corresponding to a diffusional process. The charge transfer resistance ($R_{ct}$), which is the diameter of the semicircle at the lower frequency, determined from these plots are about ~58K ohm/cm$^2$ for A and 16K ohm/cm$^2$ for A-12CR4. Similar behavior was observed for B-12CR4 with a $R_{ct}$ of approximately 1K ohm/cm$^2$.

An electrochemical cell containing a PEO (M.W = 4 × 10$^6$) lithium tetrofluoroborate (LiBF$_4$) electrolyte was prepared having an oxygen to lithium ratio of 5:1. The 12CR4 ether concentration was 3 mM. The films were cast utilizing 100 to 150 ml of MeCN solvent to a thickness of 100 μm. The films were vacuum dried at 100° C. for 48 hours. An electrochemical cell designed to hold a sample in a fixed geometry, with a known cross-sectional area and equipped with a provision to maintain either a static or dynamic ambient atmosphere was used. Standard electrochemical equipment was used to make the measurements. Polymer films are denoted as follows:

$A_1$: PEO, LiBF$_4$ without 12CR4
$A_2$: PEO, LiBF$_4$ with 12CR4

Dc cyclic voltammogram of the electrolytes ($A_1$ and $A_2$) sandwiched between two well polished stainless steel electrodes were obtained. Both electrolytes appear stable with very little leakage/breakdown current in the potential range 3-5.5 V vs. Lithium. In both cases the electrolytes used are ~100 μm thick and 1 cm$^2$ in area. Below 3 V slight irreversible reduction takes place in both electrolytes, the origin of which is not yet known. The perceptible reduction current may be due to the reduction of the residual impurities either in the PEO or in the LiBF$_4$. In most cases measurements were made positive of 3.0 V.

An electrochemical cell comprising Li/electrolyte/-Li$_x$CoO$_2$ was assembled inside an argon-filled glove box. The temperature of the cell was raised to the desired value (60° C.) and the cell was allowed to equilibrate before the open circuit voltage (OCV) was measured. The OCV of a freshly assembled cell thus measured is ~3.8 V.

The dc cyclic voltammetric curves as a function of scan rates respectively for Li/$A_1$/Li$_x$CoO$_2$ and Li/$A_2$/Li$_x$CoO$_2$ demonstrate the following features:

At slower scan rates >2 mv/sec there are well defined cathodic and anodic peaks. These peaks are very poorly defined at higher scan rates. The peak splitting is smaller with 12CR4 in the electrolytes than without indicating a greater reversible behavior. This again is due to a decrease in charge transfer resistance ($R_{ct}$) in the presence of 12CR4.

At a particular scan rate, the current is higher with the 12CR4 additive incorporated in the electrolyte.

These measurements were repeated at 70° C. and 80° C. and found to be equivalent to the scans at 60° C.

The OCV of a freshly assembled Li/Polymer electrolyte/Li$_x$CoO$_2$ with and without 12CR4 additive is ~3.8 V. The dc cyclic curves indicate that the peak splitting is smaller and the current is higher for cells with 12CR4 than without.

The values of the charge transfer kinetic parameters are summarized in the following table:

TABLE 1

| Electrolyte System | Charge Transfer Resistance, $R_{ct}$, K ohm |
|---|---|
| PEO/LiSO$_3$CF$_3$ | 58.00 |
| PEO/LiSO$_3$CF$_3$-12CR4 | 16.00 |
| PEO/LiClO$_4$-12CR4 | 1.00 |
| PEO/LiBF$_4$ | 48.50 |
| PEO/LiBF$_4$-12CR4 | 1.75 |

The interfacial charge resistance is reduced by a factor of at least 3 in the presence of 12CR4 ether and is as low as 1.0K ohm in the case of PEO/LiClO$_4$. The order of magnitude increase in conductivity and exchange current density results in a 100 fold increase in power density. The charge transfer and conductivity effects are consistently shown in several lithium salt electrolytes. The concentration of 12CR4 appears to be critical and limited to amounts below 6 mM preferably, below about 3 mM. Dc cyclic curves indicate that the peak splitting is smaller and the current is higher for cells having PEO electrolytes containing 12CR4.

Batteries containing the improved electrolyte of this invention permit operation of the battery at a lower temperature with improved efficiency. In addition to electrochemical devices the 12CR4 containing PEO-Li salt complex may find use in electrochromic devices and ion selective electrodes.

It is to be realized that only preferred embodiments of the invention have been described and that numerous substitutions, modifications and alterations are permissible without departing from the spirit and scope of the invention as defined in the following claims.

We claim:

1. A solid electrolyte comprising in combination:
   a solid polyethylene oxide matrix;
   a dispersion of a lithium salt in the matrix, the ratio of oxygen to lithium in the polyethylene oxide matrix being from 1 to 1 to 10 to 1; and
   further including 12 Crown-4-ether in an amount effective to increase conductivity.

2. A polyelectrolyte according to claim 1 in which the ratio is about 5 to 1.

3. A polyelectrolyte according to claim 2 in which the lithium salt is selected from LiBF$_4$, LiCF$_3$SO$_3$, LiClO$_4$ and LiAsF$_6$.

4. A polyelectrolyte according to claim 3 in which the lithium salt is LiClO$_4$.

5. A polyelectrolyte according to claim 1 in which 12-Crown-4 ether is present in the polyelectrolyte in an amount from about 1 mM to about 6 mM.

6. A polyelectrolyte according to claim 5 in which the 12-Crown-4 ether is present in the polyelectrolyte in an amount of less than about 3 mM.

7. A battery comprising in combination:
   a thin film of electrolyte according to claim 1;
   a lithium anode in contact with one face of the film;

a cathode in contact with an obverse face of the film; and a first terminal in electrical communication with the anode, and a second terminal in electrical communication with the cathode.

8. A battery according to claim 7 in which the cathode is an insertion cathode.

9. A battery according to claim 8 in which the cathode includes $TiS_2$ or $CoO_2$.

10. A method of forming a solid electrolyte comprising the steps of:

dissolving a solid polyethylene oxide polymer in vaporizable solvent to form a solution;

dispersing a lithium salt and 12-Crown-4 ether in the solution;

casting the solution into a thin film; and removing the solvent from the thin film.

11. A method according to claim 10 in which the film is in the form of a disc.

12. A method according to claim 11 in which the film has a thickness from 1 $\mu$m to 1000 $\mu$m.

* * * * *